(12) United States Patent
Harkey

(10) Patent No.: US 9,581,074 B2
(45) Date of Patent: Feb. 28, 2017

(54) ENGINE THERMOSTAT WITH INTEGRATED COOLANT FILTER

(71) Applicant: Jerry P Harkey, Bloomfield Hills, MI (US)

(72) Inventor: Jerry P Harkey, Bloomfield Hills, MI (US)

(73) Assignee: FCA US LLC, Auburn Hills ( * ) Notice: Subject to any disclaimer, the term of this patent is extended or adjusted under 35 U.S.C. 154(b) by 241 days.

(21) Appl. No.: 14/579,161

(22) Filed: Dec. 22, 2014

(65) Prior Publication Data

US 2016/0177809 A1    Jun. 23, 2016

(51) Int. Cl.
*F01P 7/16* (2006.01)
*F01P 11/12* (2006.01)

(52) U.S. Cl.
CPC ............... *F01P 7/16* (2013.01); *F01P 11/12* (2013.01)

(58) Field of Classification Search
CPC .... F01P 7/16; F01P 7/161; F01P 11/12; F01P 2011/061
USPC ........................................................ 236/34.5
See application file for complete search history.

(56) References Cited

U.S. PATENT DOCUMENTS

| | | | |
|---|---|---|---|
| 2,692,086 A | 10/1954 | Butler, Jr. | |
| 3,540,528 A | 11/1970 | Moon | |
| 4,948,043 A | 8/1990 | Kuze | |
| 5,140,951 A | 8/1992 | Carr | |
| 5,281,331 A | 1/1994 | Golan | |
| 5,337,704 A | 8/1994 | Roth | |
| 5,382,355 A * | 1/1995 | Arlozynski | B01D 27/101 165/119 |
| 8,469,083 B2 * | 6/2013 | Jainek | F01M 5/002 123/196 AB |
| 8,651,069 B2 | 2/2014 | Borgia et al. | |
| 2004/0107922 A1 | 6/2004 | Roth | |

* cited by examiner

*Primary Examiner* — Marc Norman
(74) *Attorney, Agent, or Firm* — Ralph E Smith

(57) ABSTRACT

A thermostat assembly for use with an engine cooling system includes a thermostat, a frame, a bypass valve and an integrated filter. The frame supports the thermostat and is positioned upstream of a thermostatic valve. The frame also defines a primary coolant passage. The bypass valve is positioned on the frame and selectively defines a bypass coolant passage. The filter is positioned on the frame upstream of the thermostat and is configured to filter coolant flowing through the primary coolant passage to the thermostat. The bypass valve moves between a normally closed position and an open position where coolant is free to pass through the bypass coolant passage and to the thermostat. The bypass valve moves to the open position upon being subjected to a predetermined pressure caused by a reduction in a coolant flow rate through the filter so as to provide for coolant flow to bypass the filter.

12 Claims, 4 Drawing Sheets

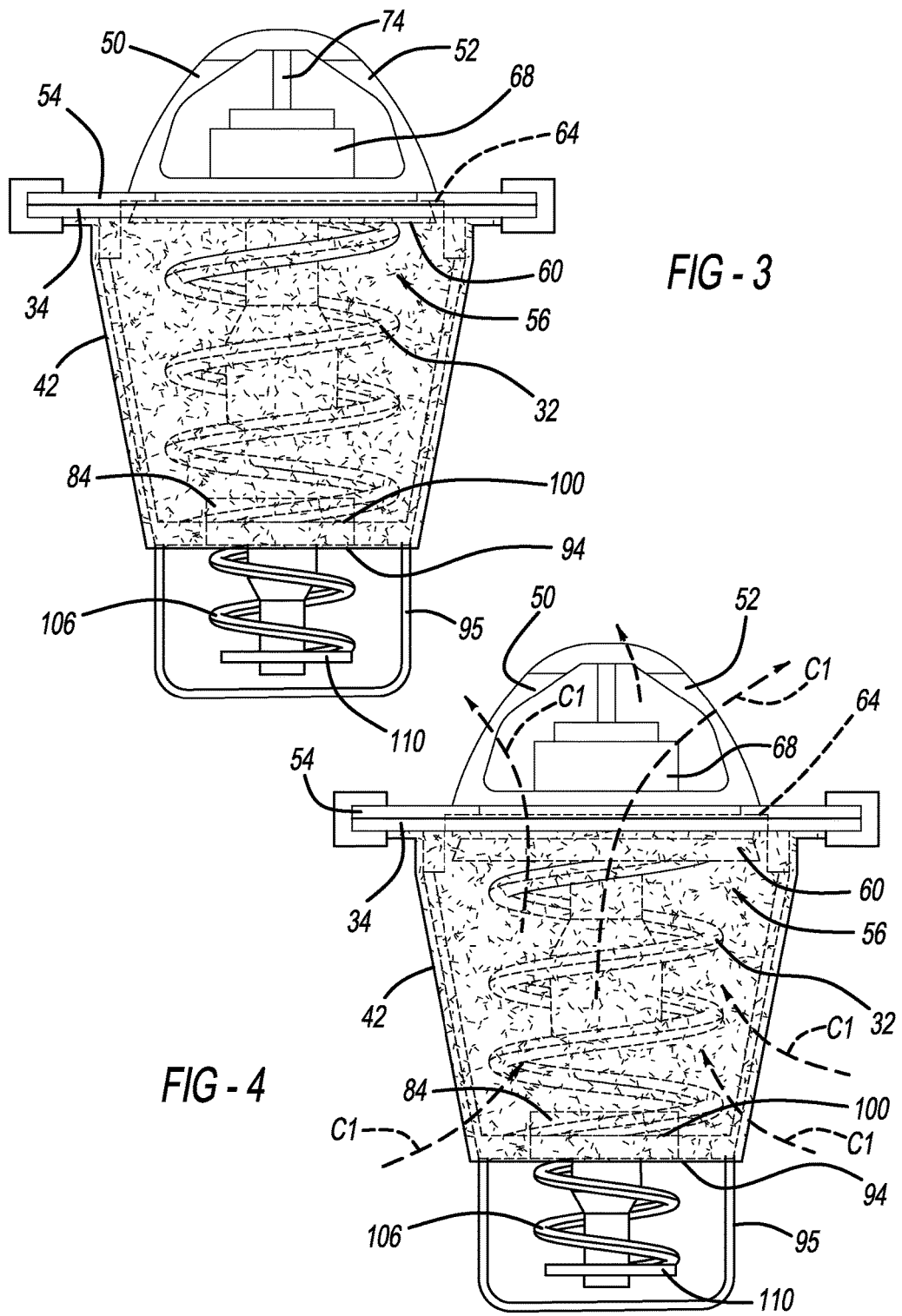

ENGINE THERMOSTAT WITH INTEGRATED COOLANT FILTER

FIELD

The present application relates generally to thermostats for use with an engine of a motor vehicle and, more particularly, to a thermostat assembly incorporating an integrated filter.

BACKGROUND

Motor vehicles typically incorporate cooling systems to maintain a desired operating temperature of an associated internal combustion engine. While some motor vehicles are air cooled, most vehicles employ liquid or coolant based cooling systems. Typically, such a cooling system circulates coolant through passageways in the engine and include a thermostat located between the engine and a radiator. The thermostat generally includes a thermostatic valve that is configured to block a flow of coolant to the radiator until the engine has reached a predetermined operating temperature. These cooling systems and engines typically carry various contaminants including, but not limited to, machining chips and/or sand, rubber and other debris. Such contaminants may be carried by the coolant and impinge on the thermostat, which may damage the thermostat in general and specifically the thermostatic valve over time. Thus, while conventional thermostats work for their intended purpose there remains a need for improvement in the relevant art.

SUMMARY

In accordance with an aspect of the invention, a thermostat assembly configured for use in an engine cooling system is provided. In one exemplary implementation, the thermostat assembly includes a thermostat, a frame, a bypass valve and an integrated filter. The thermostat includes a thermostatic valve having a valve element that moves between (i) a closed position wherein coolant is inhibited from passing through the thermostatic valve; and (ii) an open position wherein coolant is free to pass through the thermostatic valve. The frame supports the thermostat and is positioned upstream of the thermostatic valve, and defines a primary coolant passage. The bypass valve is disposed on the frame and selectively defines a bypass coolant passage. The bypass valve moves between (i) a normally closed position wherein coolant is inhibited from passing through the bypass valve and (ii) an open position wherein coolant is free to pass through the bypass coolant passage and to the thermostat. The integrated filter is positioned on the frame upstream of the thermostat and is configured to filter coolant flowing through the primary coolant passage and to the thermostat. The bypass valve moves from the normally closed position to the open position upon being subjected to a pressure above a predetermined pressure threshold caused by a reduction in a coolant flow rate through the filter so as to provide the bypass coolant passage bypassing the filter.

According to additional features, the frame includes an upper rim that supports the thermostat and a lower rim that supports the bypass valve. The frame also includes intermediate support members that connect the upper rim and the lower rim and position the upper rim and the lower rim at a laterally offset position relative to each other.

According to still other features, the primary coolant passage is defined between the upper and lower rims and the intermediate support members. In one exemplary implementation, the filter is annularly supported by the intermediate support members and the intermediate support members taper toward the lower rim. In one exemplary implementation, the filter comprises an annular filter extending from the lower rim to the upper rim such that, when the bypass valve is in the normally closed position, all coolant flowing to the thermostatic valve flows through the filter.

In one exemplary implementation, the filter is adapted to filter debris carried by the coolant and, wherein upon debris building up on the filter causes the flow rate of the coolant flowing through the filter to be reduced below a predetermined threshold that correlates to the pressure at the bypass valve reaching the predetermined pressure threshold, the bypass valve moves to the open position to provide the bypass coolant passage for coolant to flow to the thermostatic valve.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a side view of the thermostat assembly according to the principles of the present disclosure and shown with the thermostatic valve in a closed position;

FIG. 4 is a side view of the thermostat assembly according to the principles of the present disclosure and shown with the thermostatic valve in an open position and with coolant flowing substantially freely through a filter positioned upstream of the thermostatic valve and shown with a bypass valve in a closed position.

DESCRIPTION

Figure 1:
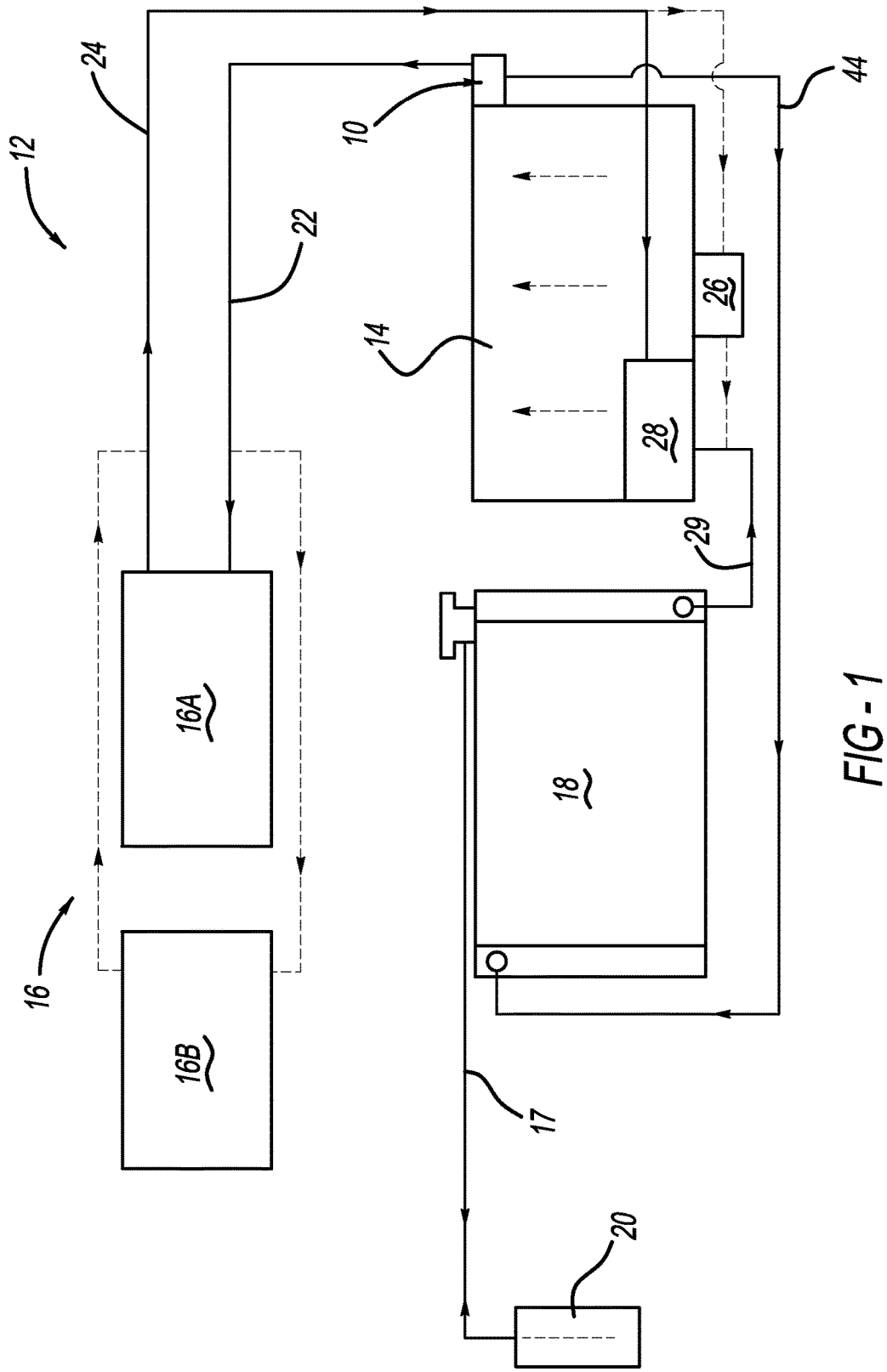
FIG. 1 is a schematic illustration of a cooling system for an internal combustion engine and incorporating a thermostat according to the principles of the present disclosure.
Figure 2:
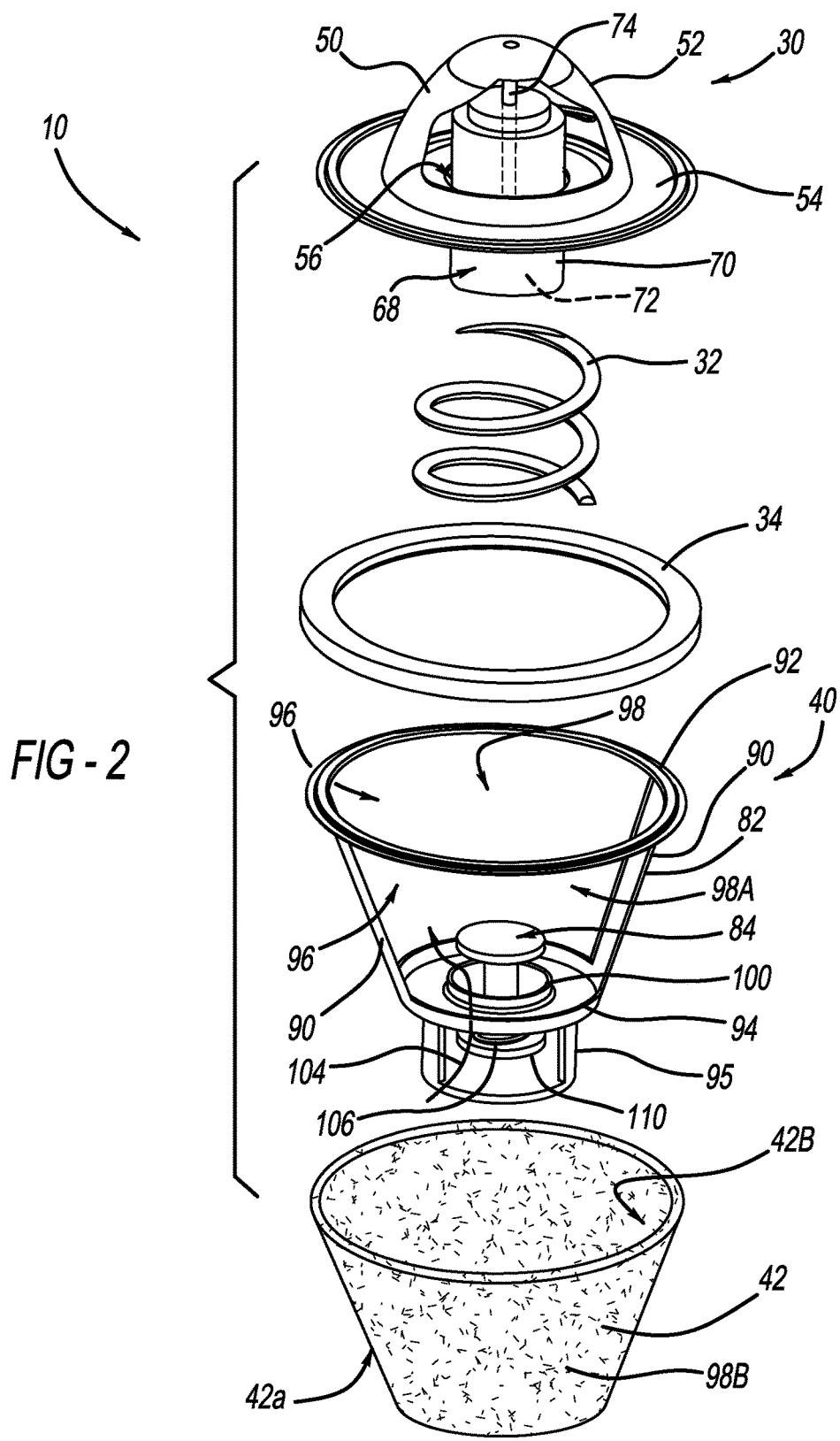
FIG. 2 is an exploded view of an exemplary thermostat assembly constructed in accordance with one example of the present disclosure.

With initial reference to FIGS. 1 and 2, a thermostat assembly constructed in accordance with one example of the present disclosure is shown and generally identified at reference numeral 10. The thermostat assembly 10 is arranged in a cooling system 12 of an internal combustion engine 14. The cooling system 12 maintains the temperature of the internal combustion engine 14 in a range that will provide satisfactory engine performance and emission levels under all expected driving conditions. The cooling system 12 also provides hot coolant to improve performance of an engine heater shown collectively at reference 16 and individually identified as a front heater 16A and a rear heater 16B. This is accomplished by transferring heat from engine metal to the coolant. The heated coolant is moved to a radiator 18 where heat is then transferred to ambient air.

Coolant is permitted to flow through a connecting hose 17 that connects between the radiator 18 and a coolant recovery container 20. The coolant recovery container 20 releases and stores coolant to maintain the predetermined system pressure and some coolant for future use. Once the temperature (and therefore pressure) of the engine 14 becomes stable, the coolant flowing to or from the coolant recovery container 20 ceases flow through the connecting hose 17 to the radiator 18. A coolant delivery hose 22 connects the thermostat assembly 10 to an inlet of the heater 16. A coolant return hose 24 connects an outlet of the heater 16 to the fluid pump 26. An engine oil cooler 26 can optionally be included to cool the engine oil with the coolant returning from the heater 16. The thermostat assembly 10 can be incorporated on gas engine or diesel engine configurations within the scope of the present disclosure.

The cooling system 12 also includes a fluid pump 28. The fluid pump 28 can be a conventional engine driven pump or an electrically driven pump. The fluid pump 28 includes an impeller that draws coolant through a pump connecting hose 29 from the radiator 18 and urges it into the engine 14.

Figure 5:
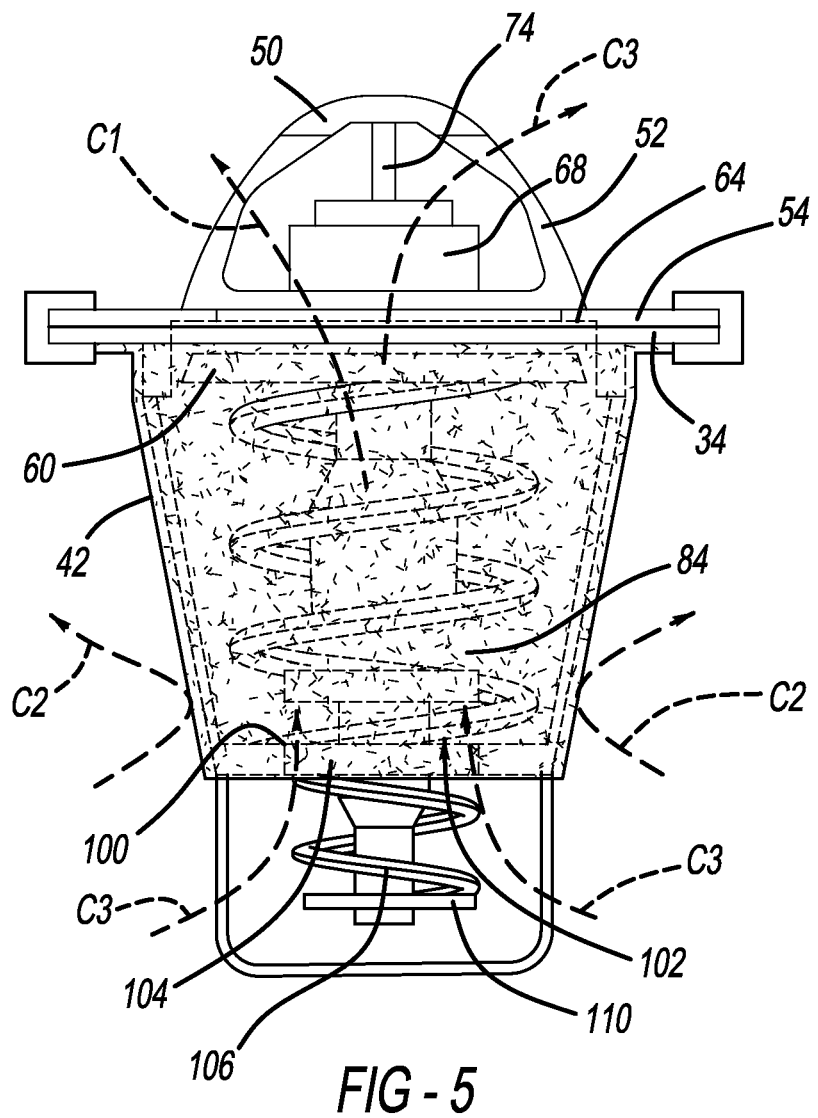
FIG. 5 is a side view of the thermostat assembly illustrated in FIG. 4 and shown in the open position and with coolant substantially inhibited from flowing through the filter and with the bypass valve in an open position.

With continued reference to FIG. 1 and additional reference to FIG. 2, the thermostat assembly 10 includes, in one exemplary implementation, a thermostat 30, a thermostat return spring 32, a gasket 34, a bypass valve assembly 40 and a filter 42. In general, the thermostat 30 is configured to move from a closed position (FIG. 3) to an open position (FIGS. 4 and 5).

When the engine 14 is cold and the thermostat 30 is closed, the cooling system 10 has little to no flow through the radiator 18. Specifically, when the engine 14 is cold, the thermostat 30 is closed and coolant is precluded or substantially precluded from flowing from the thermostat 30, through a radiator supply hose 44 and to the radiator 18. When the engine 14 is warm, or has reached a threshold operating temperature, the thermostat 30 is open allowing the cooling system 10 to have bypass flow and coolant flow through the radiator 18. Explained further, when the engine 14 is warm, the thermostat 30 is open and coolant is permitted to flow from the thermostat 30, through the radiator supply hose 44 and to the radiator 18.

With particular reference to FIG. 2, the thermostat 30 will now be described in greater detail. The thermostat 30 generally includes a thermostat housing 50 having a dome portion 52 and a flange portion 54. The flange portion 54 includes a thermostatic valve 56 having a thermostatic valve element 60 that is opened and closed against a valve seat 64 (see FIGS. 3 and 4). A thermally responsive device 68 is configured to change physical state based on temperature. The thermally responsive device 68 generally includes a cylinder 70 having thermally responsive material 72 (e.g., wax) therein and arranged adjacent to a piston 74.

In this regard, when the temperature of the coolant is below a predetermined value of the thermostat 30, the thermally responsive device 68 does not change state resulting in the thermostatic valve 56 being in the closed position, or specifically, the valve element 60 seating against the valve seat 64 (FIG. 3). When the temperature of the coolant rises in excess of a predetermined threshold of the thermostat 30, the thermally responsive device 68 changes state causing the thermostatic valve 56 to move to the open position (FIGS. 4 and 5) or specifically, the valve element 60 to move away from the valve seat 64 against the bias of the thermostat return spring 32.

In one example, the thermally responsive material 72 expands ultimately urging the cylinder 70 and the valve element 60 away from the valve seat 56 and into the bias of the return spring 32. It will be appreciated that the configuration of the thermostat 30 itself is merely exemplary and that other thermostats having other configurations may be used as part of the thermostat assembly 10 within the scope of the present disclosure.

The bypass valve assembly 40 will now be described in greater detail. The bypass valve assembly 40 generally includes a frame 82 that supports a bypass valve 84. The frame 82 includes intermediate support members 90 that connect an upper rim 92 and a lower rim 94. In the example shown, the frame 82 is conical in geometry and tapers from the upper rim 92 to the lower rim 94. The filter 42 provides a similar geometry so as to be snuggly supported around the frame 82. While the drawings illustrate two intermediate support members 90, additional intermediate support members 90 may be arranged between the upper and lower rims 92 and 94, respectively. Moreover, the intermediate support members 90 may be provided in any lattice or physical structure that connects the upper and lower rims 94 while still allowing coolant to pass therethrough. The frame 82 is formed of rigid, non-corrosive material such as stainless steel or other suitable metal.

Openings 96 are defined between the intermediate support members 90. The openings 96 provide primary coolant passages 98A. The intermediate support members 90 position the upper and lower rims 92 and 94 at laterally offset positions relative to each other. The upper rim 92 supports the thermostat 30. The lower rim 94 supports the bypass valve assembly 40. The intermediate support members 90 of the frame 82 annularly support the filter 42. A lower frame cage 95 can extend below the lower rim 94.

The filter 42 is formed of material resistant to corrosion. In one example, the filter 42 is in the form of wire mesh comprised of stainless steel. The filter 42 has a porosity configured to allow coolant to pass through while inhibiting contaminants and debris from passing through. While the filter 42 is shown and described as supported by the frame 82, it may be self-supporting. In such a configuration, primary coolant passages 98B (FIG. 2) may be solely provided on the filter 42. In one self-supporting configuration, the filter 42 may incorporate the bypass valve 84 at a lower end. In another configuration, the filter 42 may be formed as part of the thermostat 30 such as a portion of the flange 54. In general, the filter 42 may be incorporated as part of the thermostat assembly 10 in any manner so as to filter coolant upstream of the thermostatic valve 56. It will be further appreciated that while the filter 42 is shown having a generally conical shape, other geometries may be implemented according to a specific application. In this regard, the conical profile of the filter 42 is exemplary and can take other forms.

During normal operating conditions of the thermostat assembly 10, coolant flows circumferentially through the filter 42 from an outer circumferential surface 42A (FIG. 2) to an inner circumferential surface 42B. In this regard, after passing through the filter 42, coolant flows through the openings 96 and therefore the primary coolant passages 98A of the frame 82 and toward the thermostat 30 (see coolant flow path C1, FIG. 4). The filter 42 therefore is upstream of the thermostat 30 and is arranged to protect the thermostat 30 from debris and contaminants. In particular, such debris and contaminants are captured by the filter 42 prior to making contact with the thermostat valve 60 and the valve seat 64. In this regard, the filter 42 extends the life of the thermostat 30.

The bypass valve 84 is configured to move between a normally closed position (FIGS. 3 and 4) to a bypass or open position (FIGS. 2 and 5). In one configuration, the bypass valve 84 is a poppet valve. Other configurations are contemplated. As can be seen in at least FIG. 2, the filter 42 does not filter coolant flowing to the bypass valve 84. In the closed position, the bypass valve 84 is seated against the bypass valve seat 100. In the open position, the bypass valve 84 is offset from a bypass valve seat 100. When the bypass valve 84 is offset from the bypass valve seat 100, a bypass opening 102 (FIG. 5) is created. The bypass opening 102 provides a bypass coolant passage 104 (FIGS. 2 and 5). With the bypass valve 84 closed, no or substantially no coolant flows to the thermostat 30 without having to flow through the filter 42. In other words, all coolant flowing to the thermostat 30 is filtered except for any coolant that flows through the open bypass valve 84.

A bypass valve biasing member 106 is mounted between the lower rim 94 of the frame 82 and a lower disk 110 associated with the bypass valve 84. As will become appreciated from the following discussion, the bypass valve 84 is configured to move from the normally closed position (FIGS. 3 and 4) to the open position (FIGS. 2 and 5) when a predetermined pressure threshold (via the coolant flow) is reached at the bypass valve 84. Explained further, as contaminants build up on the outside of the filter 42, an increased pressure is realized at the bypass valve 84 (see blocked coolant flow path C2, FIG. 5). The increased pressure acting on the bypass valve 84 (in a direction upward as viewed in FIG. 4) causes the bypass valve 84 to lift off the bypass valve seat 100 against the bias of the bypass valve biasing member 106.

The bypass valve 84 moves from the normally closed position to the open position upon reaching a predetermined pressure threshold caused at least in part to a coolant flow rate through the primary passages 98A being reduced, such as by a clogged or substantially clogged filter due to build-up of filtered debris. Coolant is therefore allowed to flow through the bypass coolant passage 104 at the bypass opening 102 (see bypass coolant flow path C3, FIG. 5) and flow to the thermostat 30.

The bypass valve 84 therefore provides flow, albeit unfiltered, to the thermostat 30 in the event the filter 42 has blocked significant coolant flow and/or has reached capacity. As shown in FIG. 5, minimal coolant flow C1 may still be flowing through the filter 42. In some examples, the filter 42 may be replaced alone or together with the thermostat assembly 10 or portions thereof during a maintenance schedule.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A thermostat assembly configured for use with an engine cooling system, the thermostat assembly comprising:
    a thermostat having thermostatic valve that moves between a closed position and an open position;
    a frame that supports the thermostat and is positioned upstream of the thermostatic valve, the frame defining a primary coolant passage;
    a bypass valve disposed on the frame that selectively defines a bypass coolant passage and that moves between (i) a normally closed position wherein coolant is inhibited from passing through the bypass valve and (ii) an open position wherein coolant is free to pass through the bypass coolant passage and to the thermostat; and
    an integrated filter positioned on the frame upstream of the thermostat and configured to filter coolant flowing through the primary coolant passage to the thermostat;
    wherein the bypass valve moves from the normally closed position to the open position upon being subjected to a pressure above a predetermined pressure threshold caused by a reduction in a coolant flow rate through the filter and the primary coolant passage so as to provide the bypass coolant passage bypassing the filter.

2. The thermostat assembly of claim 1 wherein the frame includes an upper rim that supports the thermostat and a lower rim that supports the bypass valve.

3. The thermostat assembly of claim 2 wherein the frame includes intermediate support members that connect the upper rim and the lower rim and position the upper rim and lower rim at a laterally offset position relative to each other.

4. The thermostat assembly of claim 3 wherein the primary coolant passage is defined between the upper and lower rims and the intermediate support members.

5. The thermostat assembly of claim 4 wherein the filter is annularly supported by the intermediate support members.

6. The thermostat assembly of claim 5 wherein the filter comprises an annular filter extending from the lower rim to the upper rim such that, when the bypass valve is in the normally closed position, all coolant flowing to the thermostatic valve flows through the filter.

7. The thermostat assembly of claim 6, wherein the filter is adapted to filter debris carried by the coolant and, wherein upon debris building up on the filter causes the flow rate of the coolant flowing through the filter to be reduced below a predetermined threshold that correlates to the pressure at the bypass valve reaching the predetermined pressure threshold, the bypass valve moves to the open position to provide the bypass coolant passage for coolant to flow to the thermostatic valve.

8. The thermostat assembly of claim 4 wherein the intermediate support members taper toward the lower rim.

9. The thermostat assembly of claim 8 wherein the filter is generally conical and wherein coolant flows radially from an outer circumferential surface to an inner circumferential surface of the filter.

10. The thermostat assembly of claim 1 wherein the bypass valve is a poppet valve.

11. The thermostat assembly of claim 1 wherein the filter is formed of wire mesh.

12. The thermostat assembly of claim 1 wherein the thermostatic valve includes a thermostatic valve element that moves between (i) the closed position wherein coolant is inhibited from passing through the thermostatic valve; and (ii) the open position wherein coolant is free to pass through the thermostatic valve.

* * * * *